(12) United States Patent
Johnson et al.

(10) Patent No.: US 7,802,719 B2
(45) Date of Patent: Sep. 28, 2010

(54) SYSTEM AND METHOD FOR PRESENTING MULTIPLE TRANSACTION OPTIONS IN A PORTABLE DEVICE

(75) Inventors: Phillip Marc Johnson, Raleigh, NC (US); L. Scott Bloebaum, Cary, NC (US); Daniel P. Homiller, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1034 days.

(21) Appl. No.: 11/537,347

(22) Filed: Sep. 29, 2006

(65) Prior Publication Data

US 2008/0078831 A1 Apr. 3, 2008

(51) Int. Cl.
*G06K 5/00* (2006.01)
(52) U.S. Cl. .................. 235/380; 235/379; 235/383
(58) Field of Classification Search ............. 235/380, 235/379, 383; 705/41
See application file for complete search history.

(56) References Cited

U.S. PATENT DOCUMENTS

| | | | |
|---|---|---|---|
| 5,917,913 | A | 6/1999 | Wang |
| 7,020,102 | B2 | 3/2006 | Tuomainen et al. |
| 7,023,421 | B2 | 4/2006 | Wong et al. |
| 7,047,416 | B2 | 5/2006 | Wheeler et al. |
| 7,089,214 | B2 | 8/2006 | Wang |
| 7,110,993 | B2 | 9/2006 | Soulanille et al. |
| 7,376,583 | B1 * | 5/2008 | Rolf ........................... 705/17 |
| 7,413,113 | B1 * | 8/2008 | Zhu, Kevin ................ 235/375 |
| 2004/0267663 | A1 * | 12/2004 | Karns et al. ................ 705/40 |
| 2006/0018450 | A1 * | 1/2006 | Sandberg-Diment ..... 379/93.12 |
| 2006/0074701 | A1 * | 4/2006 | Liu ............................... 705/1 |
| 2008/0052091 | A1 * | 2/2008 | Vawter ......................... 705/1 |

OTHER PUBLICATIONS

International Preliminary Report on Patentability for corresponding Application No. PCT/US2007/064758 mailed Apr. 9, 2009.
International Search Report for corresponding Application No. PCT/US2007/064758 mailed Nov. 26, 2008.

* cited by examiner

*Primary Examiner*—Ahshik Kim
(74) *Attorney, Agent, or Firm*—Renner, Otto, Boisselle & Sklar, LLP

(57) ABSTRACT

A portable device authorizes a payment transaction from an account associated with the portable device. The portable device comprises a communication system, such as a near field communication (NFC) system, for communicating with a transaction system of a merchant or other receiving entity, a user interface, a memory storing account information for each of a plurality of accounts, and a transaction application. The transaction application applies at least one predetermined selection rule to the plurality of accounts to determine a selected subset of the plurality of accounts. A display of the user interface displays, under control of the transaction application, a plurality of transaction option indicators. Each transaction option indicator, which may be text or graphic, represents a one of the accounts within the selected subset of accounts. The transaction application prompts user selection of a selected one of the transaction option indicators. The transaction application drives the communication system to exchange data with the transaction system of a merchant or other receiving entity to initiate a payment to the merchant. The payment being from the payment account associated with the selected one of the transaction option indicators.

27 Claims, 6 Drawing Sheets

SYSTEM AND METHOD FOR PRESENTING MULTIPLE TRANSACTION OPTIONS IN A PORTABLE DEVICE

TECHNICAL FIELD OF THE INVENTION

The present invention relates to systems and methods for using a portable device for conducting a transaction with a transaction system of a merchant or other receiving entity and, in particular, systems and methods for presenting multiple transaction options for user selection.

DESCRIPTION OF THE RELATED ART

Payment for goods or services at a merchant's point of sale system typically involves the customer paying cash, writing a check, or paying by some form of electronic payment transaction such as a credit or charge card "signature" transaction or some form of a debit transaction such as a debit of a traditional checking account or a debit of a pre-paid spending account such as the EDY mobile payment service that has become very popular in Japan.

Traditionally a customer desiring to pay by some form of electronic payment transaction presents a card representing the transaction account to the merchant. The card provides account information needed for initiating the electronic payment transaction and provides some security in that the card's physical presence in the custody of the customer is some circumstantial evidence that the customer is authorized to initiate payment transactions on the account. In some cases, a personal identification number (PIN) is required for further evidence of authorization.

Further, if the customer desires to associate the transaction with an affinity, membership, or other type of discount, loyalty, or similar program, the customer traditionally provides the applicable account information to the merchant in the form of a card which again provides some circumstantial evidence that the customer is authorized to use such account. Typically this is performed before initiating the payment transaction.

Further yet, if the customer desires to apply a coupon to the transaction, the customer traditionally provides a paper coupon to the merchant and the merchant initiates a coupon transaction for adjusting the amount due. Coupon transactions are typically initiated before the payment transaction.

More recently it has been proposed to enable a portable device, such as a mobile telephone, PDA, or other portable electronic device, to function as an "electronic wallet" which stores the account information for each of a plurality of transaction accounts.

To make an electronic payment from a transaction account for which account information is stored and managed by an electronic wallet application, the user of the device initiates the electronic wallet application, selects a transaction account from the plurality of transaction accounts managed by the electronic wallet application, and authorizes the payment. The electronic wallet application then receives transaction-related information from the merchant and supplies the account-related information necessary to complete the transaction to the merchant. While this exchange can be done in various ways, Near Field Communication (NFC) technology is an exemplary technology that can be used for secure contact-less exchange of the transaction information.

As electronic payments using mobile devices become more common, it is expected that individuals will have multiple payment means in their electronic wallets just as individuals currently carry multiple credit, debit, ATM, or other cards in their physical wallets today. The anticipated difficulty of navigating multiple, and layered, menus in a traditional manner using a limited user interface (e.g., limited key board, limited display size, and limited display resolution) of a portable device such as a mobile telephone, PDA, or similar creates a usability challenge which could inhibit consumer adoption and usage of mobile electronic payments. This usability challenge is further exacerbated when additional transaction options such as electronic coupons and/or accounts representing affinity, membership, or other types of discount, loyalty, or similar programs are added to the portable device.

What is needed is a system and method for operating a portable device such as a mobile telephone, PDA, or similar mobile device in a manner that does not suffer the disadvantages of known systems. In more detail, what is needed is a system and method for presenting multiple transaction options on a portable device and facilitating user selection of a one or more of the multiple transaction options in an easy and convenient manner.

SUMMARY

A first aspect of the present invention comprises a portable device for conducting a transaction from an account associated with the portable device. The portable device comprises a user interface, a memory storing account information for each of a plurality of accounts, a transaction application, and power management circuitry. The portable device further comprises a communication system, such as a Near-Field Communication (NFC) system, for communicating with a transaction system of a merchant or other receiving entity.

Each account may be one of: i) a payment account such as credit or charge "signature" transaction account or a debit account such as checking account or EDY; ii) an alternative payment transaction account such as PayPal®; iii) a program account representing an affinity, membership, or other type of discount, loyalty, or similar program; and iv) an electronic coupon.

The transaction application applies at least one predetermined selection rule to the plurality of accounts to determine a selected subset of the plurality of accounts. A display of the user interface displays, under control of the transaction application, a plurality of transaction option indicators. Each transaction option indicator, which may be text or graphic, represents a one of the accounts within the selected subset of accounts.

The transaction application prompts user selection of a selected one (or at least one) of the transaction option indicators. User selection may be by use of a first and second button on an outside of the housing of the portable device for scrolling a highlight bar over a sequence of the transaction option indicators and use of third button on the housing for selecting a one of the transaction option indicators. The first and the second button may be paired keys such as volume buttons. The third button may be an additional key such as a photo or camera button.

Alternatively, user selection may be use of a thumbwheel on an outside of the housing of the portable device (such as a volume control thumbwheel) for scrolling a highlight bar over a sequence of the transaction option indicators by rotation of the thumbwheel. In this embodiment selection a one of the transaction option indicators may be by use of a third button on the housing or may be by depressing of the thumbwheel itself.

As another alternative, user selection may be by use of a portion of a touch sensitive region on the outside of the housing of the portable device (such as a volume control touch region similar to that found on popular MP3 players) for scrolling a highlight bar over a sequence of the transaction option indicators and use of a portion of the touch sensitive region (such as a central portion of the touch sensitive region) for selecting a one of the transaction option indicators.

The transaction application drives the communication system to provide account information to the transaction system of a merchant or other entity receiving account information. For a selected transaction option indicator representing an account which represents an electronic coupon, providing account information to the transaction system comprises providing the electronic coupon information needed for the transaction system of the merchant (or other receiving entity) to apply the electronic coupon to the purchase.

For a selected transaction option indicator representing an account which represents an affinity, membership, or other type of discount, membership, loyalty, or similar program account, providing account information to the transaction system comprises providing that information needed for the transaction system of the merchant (or other receiving entity) to associate the purchase with such affinity, membership, or other type of discount, membership, loyalty, or similar program account.

For a selected transaction option indicator representing a payment account (credit, debit, ATM, EDY, or alternative payment accounts such as PayPal®), providing account information to the transaction system of a merchant (or other receiving entity) comprises providing such information needed for the merchant to process a payment transaction using the such payment account.

The portable device may be a mobile telephone of a clam shell configuration. In such an embodiment, the transaction application provides for scrolling each of the sequence of transaction option indicators into an external display—which is typically of a size and resolution for accommodating display of only a single transaction option indicator at any particular time. In this embodiment, the above discussed user interface control options are configured on the external portion of the housing for operation when the housing is in a closed configuration.

The power management circuitry may control a transition of the portable device from a low power state to an active state and launch the transaction application upon the communication system receiving a signal from a transaction system of a merchant or other receiving entity. Such a feature enables use of the portable device without requiring the user to initiate the transition to active state by means such as opening the clam shell housing or depressing predefined buttons or keys.

In one sub embodiment, the transaction application may receive an indication of each of a plurality of transaction settlement options accepted by the transaction system of a merchant or other receiving entity. In such sub embodiment, the at least one predetermined selection rule comprises limiting the selected subset of the plurality of accounts to only those accounts that correspond to a type accepted by the transaction system of the merchant.

In another sub embodiment, the transaction application may receive an indication of an amount of the payment from the transaction system of a merchant or other receiving entity. In such sub embodiment, the at least one predetermined selection rule comprises, with respect to the payment accounts, limiting the selected subset of the plurality of accounts to only those accounts which have an available credit that exceeds the amount of the payment due.

In yet another sub embodiment, the at least one predetermined selection rule comprises limiting the selected subset of the plurality of accounts to only those accounts which are associated with the merchant (or other receiving entity) with which the transaction is to be conducted (or associated with a class of entities which includes the merchant (or other receiving entity) with which the transaction is to be conducted) in a transaction management database. The association of an account with the merchant may be by user configuration.

In yet another sub embodiment, the transaction application may further display the plurality of transaction option indicators in a priority order. The priority order may be determined by the transaction application applying at least one predetermined sort rule to the selected subset of the plurality of accounts.

The at least one predetermined sort rule may be a sort rule which drives the priority order of the transaction option indicators based on an association between the merchant (or other receiving entity) with which the transaction is to be conducted (or an association with a class of entities which includes the merchant (or other receiving entity) with which the transaction is to be conducted) and the account in the transaction management database. Again, the association may be by user configuration. Alternatively, the association may be determined by the transaction application based on historical usage of the account with the merchant or the class of merchants (or class of other receiving entities). In more detail a transaction management database may include a score value derived by tracking transaction activity of the portable device and the association may be determined by the score value.

A second aspect of the present invention comprises a method of operating a portable device for conducting a transaction from an account associated with the portable device. The method comprises: i) maintaining an account database storing account information for each of a plurality of accounts; ii) applying at least one predetermined selection rule to the plurality of accounts to determine a selected subset of the plurality of accounts; iii) displaying a plurality of transaction option indicators, each of the plurality of transaction option indicators representing a one of the subset of the plurality of accounts; iv) obtaining user selection of a selected one (or at least one) of the transaction option indicators; and v) generating a communication signal to a transaction system of a merchant or other entity receiving transaction information. The communication signal includes the account information of the selected one of the transaction option indicators.

User selection may be by use the user interfaces discussed with respect to the first aspect of the present invention.

Again, in one sub embodiment, the portable device may receive, from the transaction system of a merchant or other receiving entity, an indication of each of a plurality of transaction settlement options accepted by the transaction system of such merchant or other receiving entity. In such sub embodiment, the at least one predetermined selection rule comprises limiting the selected subset of the plurality of accounts to only those accounts which correspond to a transaction settlement option accepted by the transaction system of the merchant or other receiving entity with which the transaction is to be conducted.

Again, the portable device may receive an indication of an amount due from the transaction system of the merchant or other receiving entity. In such sub embodiment, the at least one predetermined selection rule comprises limiting, with respect to payment accounts, the selected subset of the plurality of accounts to only those accounts which have an available credit which exceeds the amount of the payment.

Again, the at least one predetermined selection rule may comprise limiting the selected subset of the plurality of accounts to only those accounts which are associated with the merchant (or other receiving entity) in a transaction management database. The association of an account with the merchant (or other receiving entity) may be by user configuration of an association between the account and the merchant (or other receiving entity) or a class of entities.

Again, at least one predetermined sort rule may be applied to the selected subset of the plurality of accounts to determine a priority order. The display of the plurality of transaction option indicators may be in the priority order.

Again, the at least one predetermined sort rule may be a sort rule which drives the priority order of the transaction option indicators based on an association between the merchant (or other receiving entity) with which the transaction is to be conducted (or an association with a class of entities which includes the merchant (or other receiving entity) with which the transaction is to be conducted) and the account in the transaction management database. Again, the association may be by user configuration or the association determined by the transaction application based on historical usage of the account with the merchant (or other receiving entity) or the class of entities which includes the merchant (or other receiving entity).

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
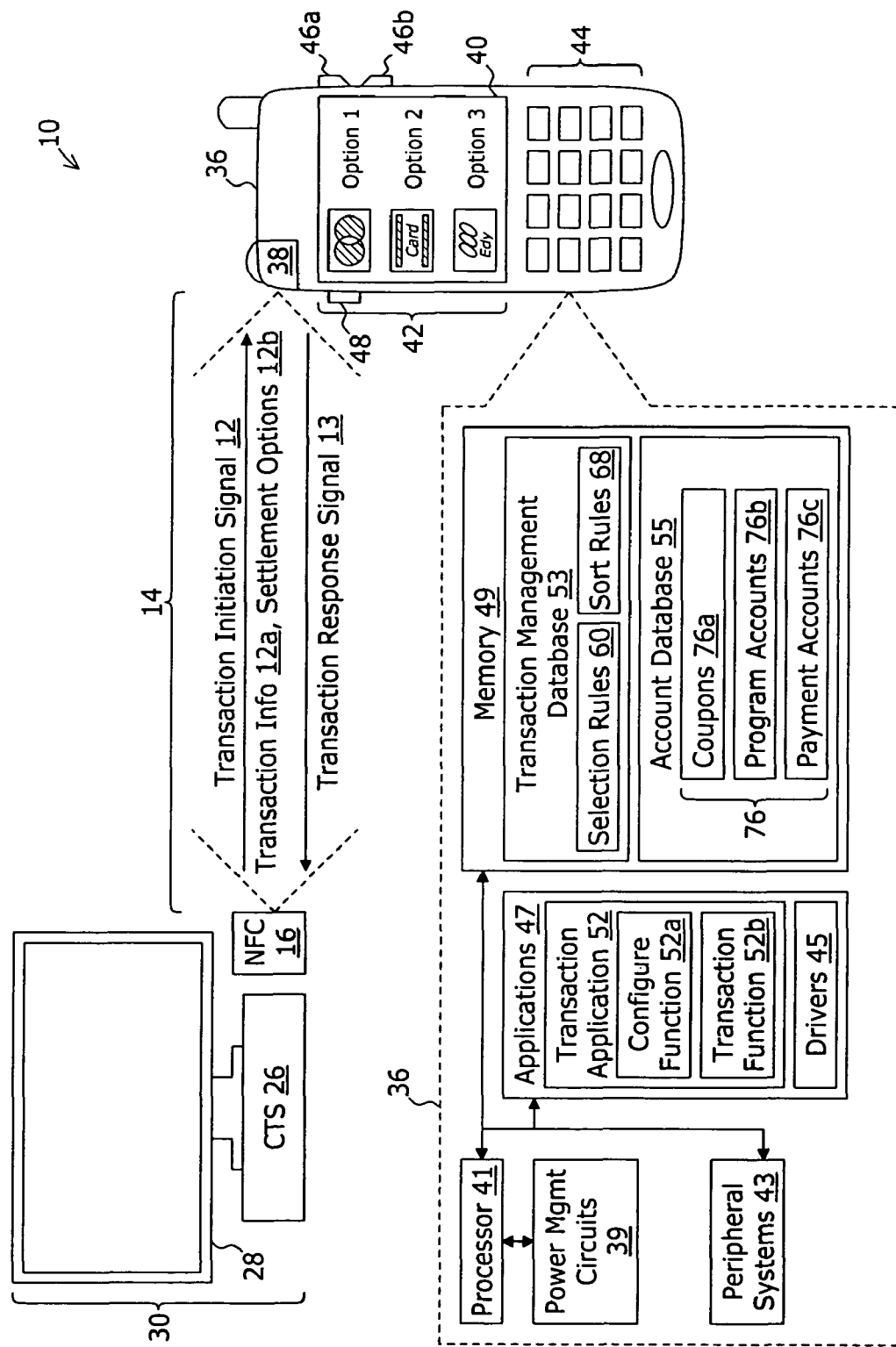
FIG. 1 is a diagram representing an exemplary architecture for a system for utilizing a portable device to conduct a transaction in accordance with one embodiment of the present invention.

The term "electronic equipment" as referred to herein includes portable radio communication equipment. The term "portable radio communication equipment", also referred to herein as a "mobile radio terminal" or "portable device", includes all equipment such as mobile phones, pagers, communicators, e.g., electronic organizers, personal digital assistants (PDAs), smart phones or the like.

Many of the elements discussed in this specification, whether referred to as a "system" a "module" a "circuit" or similar, may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

Table and/or database structures represented in this application are exemplary only and intended to show the mapping of relationships between various data elements. Those skilled in the art will recognize that other table and/or database structures may store similar data elements in a manner that maintains the relationships useful for the practice of the present invention without departing from the scope of the present invention.

With reference to FIG. 1, an exemplary architecture for a system 10 for utilizing a portable device 36 to initiate and authorize an electronic payment transaction to a merchant 30 is shown. In accordance with the exemplary system 10, the merchant 30 may include a conventional transaction system 26 (CTS) which may comprise a magnetic stripe reader and keypad for user entry. The CTS system 26 is used in a traditional manner for totaling an amount due to the merchant (or other receiving entity) 30.

A Near-Field Communication device (NFC device) 16 may be coupled to the CTS system 26 as a means for accepting electronic transaction information from a portable device 36. The NFC device 16 may provide a transaction initiation signal 12. The transaction initiation signal 12 may include transaction information field 12a indicating what is required to settle the transaction and transaction settlement options field 12b indicating a plurality of transaction settlement options available for settlement of the transaction (e.g. acceptance of electronic coupons, acceptance of affinity, membership, or other type of discount, membership, loyalty, or similar program accounts, and payment types accepted—for example types of credit cards accepted). The transaction initiation signal 12 may further comprise a list of items involved in the transaction (e.g. items purchased) and the number of items involved in the transaction.

Figure 6:
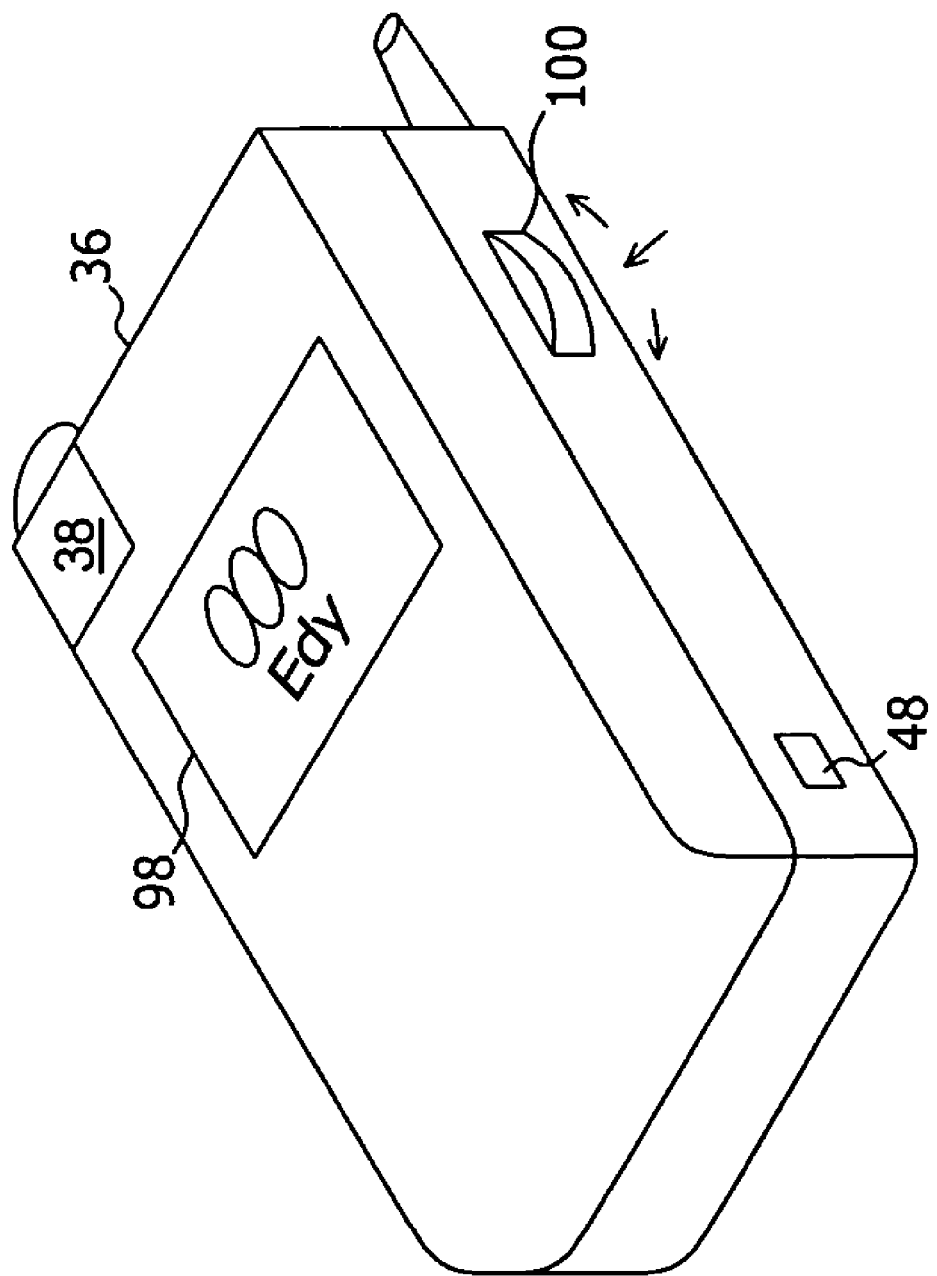
FIG. 6 is a representation of a portable device embodied in a mobile device which includes a clam shell housing in accordance with one embodiment of the present invention.

In general, the portable device 36 may be embodied in a mobile communications device such as a mobile telephone, a PDA, or a similar mobile communications device. In operation the portable device 36: i) receives the transaction initiation signal 12; ii) displays a plurality of transaction option indicators 42, in graphic or text format, on a display screen 40; iii) enables use of a first key switch 46a and a second key switch 46b (or rotation of a thumbwheel 100 as shown in FIG. 6) for scrolling amongst the displayed transaction option indicators 42; iv) enables use of a third key switch 48 (or depression of the thumbwheel 100) for selection of a one (or at least one) of the transaction option indicators 42; and v) generates a transaction response signal 13 back to the NFC device 16. The transaction response signal 13 may include the account information of the account associated with the selected one of the transaction option indicators 42. Further, if the account associated with the selected one of the transaction option indicators 42 is a payment account, the transaction response signal 13 may further include an authorization for the merchant (or other receiving entity) to initiate an electronic payment transaction to be drawn from such payment account.

The portable device 36 may include a processor 41 for executing applications 47 (including a transaction application 52 and drivers for operating various peripheral systems 43), the peripheral systems 43, and a memory 49 (which may be FLASH or other non-volatile memory) storing an account database 55 and a transaction management database 53.

Further, the portable device 36 may include known power management circuits 39 for enabling the processor 41 and the peripheral systems 43 to enter a low power state for battery life preservation when the portable device 36 is inactive. For purposes of implementing the present invention, the power management circuits 39 may drive the processor 41 and the peripheral systems 43 to resume from the low power state to an active state and commence execution of the transaction application 52 upon detection of the transaction initiation signal 12 from the NFC system 16.

The peripheral systems 43 may include a near field communication (NFC) system 38 for communication with the NFC device 16 of the CTS 26 and a user interface. The user interface may include the display 40, a keypad 44, and other programmable key switches such as the first and second key switches 46a, 46b (which may be switches typically used for controlling volume when a mobile telephone is in an active telephony session state) and the additional switch 48 (which may be a switch typically used for activating a digital camera or music player of a mobile telephone). The key switches 46a, 46b may provide for scrolling of transaction option indicators and the additional switch 48 may provide for selecting a transaction option indicator when the mobile telephone is conducting a transaction.

Alternatively, the user interface may include the display 40, the keypad 44, and other programmable user interface controls in place of, or in addition to, the key switches 46a, 46b and the additional key switch 48. The other programmable user interface controls may a thumbwheel 100 (FIG. 6). The thumbwheel 100 may provide volume control when the mobile telephone is in an active audio state and scrolling of transaction option indicators when the mobile telephone is conducting a transaction. The thumbwheel 100 may further include a programmable switch which can be activated upon depressing of the thumbwheel for selection of a transaction option indicator.

As yet another alternative, the other programmable user interface controls may include a touch sensitive panel either in place of the keypad 44 or positioned as part of the display 40 (an overlay). Such touch sensitive panel may provide volume control when the mobile telephone is in an active audio state and scrolling of transaction option indicators when the mobile telephone is conducting a transaction. The touch sensitive panel may further provide for selection of a transaction option indicator.

The transaction application 52 may include a configuration function 52a and a transaction function 52b. The configuration function 52a facilitates storing of account information for each of a plurality of accounts 76 in the account database 55.

For electronic coupons 76a, the configuration application 52a may include functions for obtaining and storing such information as the serial number, identification of items to which the coupon is applicable, expiration date, and other information traditionally associated with an electronic coupon and needed for passing to a merchant (or other receiving entity) for applying such electronic coupon 76a to a purchase.

For affinity, membership, or other types of discount, membership, loyalty, or similar program accounts 76b, the configuration application 52a may include functions for obtaining and storing such information as identification of the program, account identification, account holder name and other information traditionally associated with such an account and needed for passing to a merchant (or other receiving entity) for applying a purchase to such an account.

For payment accounts 76c, the configuration application 52a may include functions for obtaining and storing such account information necessary for initiating a payment transaction from the payment account. For example, if the payment account is a typical credit or charge card account, the account information may include identifiers for the issuer (e.g. bank) and the account number, expiration date, account holder name, and security code.

The configuration function 52a also facilitates user configuration of selection rules 60 and sort rules 68 in the transaction management database 53. The selection rules 60 and sort rules 68, once configured in the transaction management database 53, are used by the transaction function 52b: i) for determining a subset of the accounts 76 stored in the account database 55 for which to display transaction option indicators 42; and ii) determining an order in which the transaction option indicators 42 are displayed.

Figure 2A:
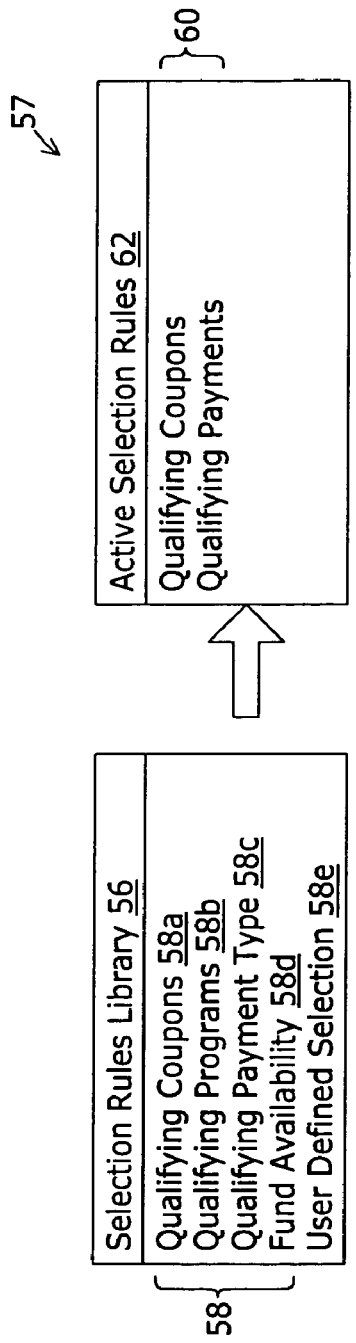
FIG. 2a is an exemplary control for configuration of active selection rules in accordance with one embodiment of the present invention.

Turning briefly to FIG. 2a in conjunction with FIG. 1, an exemplary selection rules configuration control 57 of the configuration function 52a is shown. The selection rules configuration control 57 obtains user activation of a plurality of selection rules 60. The selection rules configuration control 57 includes a selection rules library 56 and an active selection rules list 62. The selection rules library 56 includes a listing of each selection rule 58 which the user may activate. The active selection rules list 62 includes a listing of the selection rules 60 which are used by the transaction function 52b for determining a subset of the accounts 76 for which to display transaction option indicators 42.

In operation, the configuration function 52a prompts the user to paste selection rules 58 from the selection rules library 56 to the active selection rules list 62. If the selection rules configuration control 57 is implemented on a desktop or notebook computer system with a display of adequate size and resolution for display of both the selection rules library 56 and the active selection rules list 62, the control may provide for user activation of selection rules 60 by enabling standard mouse controls for pasting selection rules 58 from the selection rules library 56 to the active selection rules list 62. An application running on a desk top or notebook computer, which is linked to the portable device 36, may be useful for passing the user configuration to the portable device 36.

Alternatively, if configuration of selection rules is to be performed on the portable device, the selection rule configuration control 57 may be more conveniently implemented by displaying only one of the selection rules library 56 and the active selection rules list 62 at any particular time and using defined keys of the keypad 44 to enable the user to toggle between the two displays and paste selection rules 58 from the selection rules library 56 to the active selection rules list 62.

One exemplary selection rule is a "Qualifying Coupons" rule 58a. If the Qualifying Coupons rule 58a is an active selection rule 60, the transaction application 52 includes (and only includes) electronic coupons 76a which may be applied to the purchase as transaction options available to the user of the portable device 36 (e.g. an indicator of the coupon 76a is included in the display of transaction option indicators 42).

Another exemplary selection rule is a "Qualifying Programs" rule 58b. If the Qualifying Programs rule 58b is an active selection rule 60, the transaction application 52 includes (and only includes) those affinity, membership, or other type of discount, membership, loyalty, or similar program accounts 76b to which the purchase may be associated as transaction options available to the user of the portable device 36 (e.g. an indicator of the account is included in the display of transaction option indicators 42).

Another exemplary selection rule is a "Qualifying Payment Type" rule 58c. If the Qualifying Payment Type rule 58c is an active selection rule 60, the transaction application 52 includes (and only includes) those payment accounts 76c of a type acceptant by the merchant (or other receiving entity) 30 as transaction options available to the user of the portable device 36 (e.g. an indicator of the account is included in the display of transaction option indicators 42).

Another exemplary selection rule is a "Funds Availability" rule 58d. If the Funds Availability rule 58d is an active selection rule 60, the transaction application 52 includes, and only includes, those payment accounts 76c that have sufficient funds (either account balance or available credit) for making the payment as transaction options available to the user of the portable device 36 (e.g. an indicator of the account is included in the display of transaction option indicators 42.)

Stated another way, the transaction application 52 limits the transaction option indicators 42 displayed to those indicators 42 associated with one of a plurality of a selected subset of the accounts 76. The selected subset includes only those accounts 76 which are: i) with respect to coupons 76a, coupons 76a that can be applied to the purchase be based on coupon usage rules and the indication of items purchased as indicated in the transaction initiation signal 12; ii) with respect to affinity, membership, or other type of discount, membership, loyalty, or similar program accounts 76b, those accounts 76b to which the purchase may be associated based on program acceptance information indicated in the transaction initiation signal 12; and iii) with respect to payment accounts 76c that are associated with a payment type accepted by the merchant as identified in the transaction initiation signal 12 and/or have sufficient finds available for making the payment transaction.

Another exemplary selection rule is a "User Defined Selection" rule 58e. If the User Defined Selection rule 58e is an active selection rule 60, the transaction application 52 limits (or further limits) the selected subset of accounts 76 to those accounts 76 that the user has pre-selected to be available to a class of entities that includes the merchant (or other receiving entity) 30.

Figure 2B:
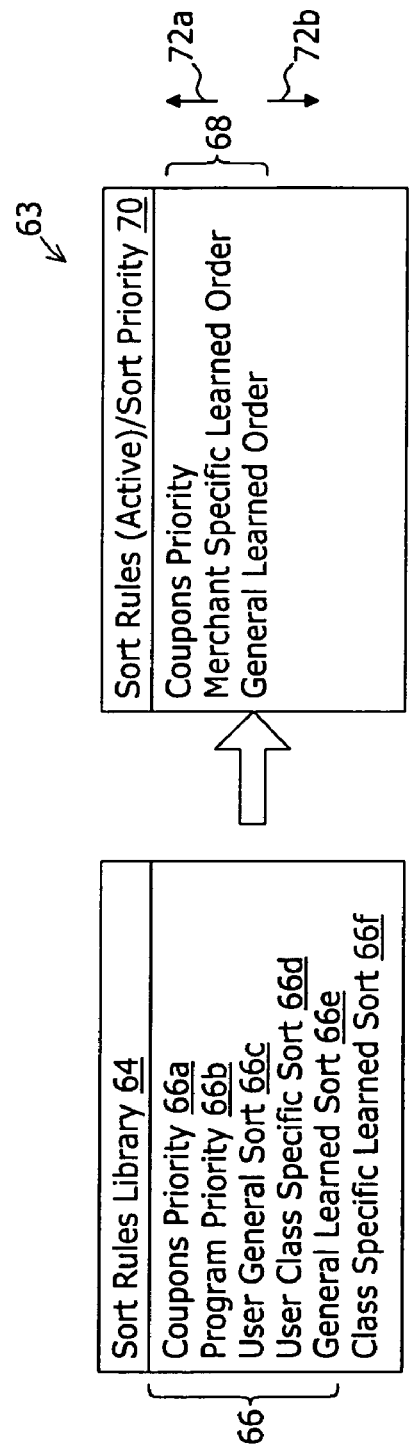
FIG. 2b is an exemplary control for configuration of active sort rules in accordance with one embodiment of the present invention.

Turning briefly to FIG. 2b in conjunction with FIG. 1, an exemplary sort rules configuration control 63 is shown. The sort rules configuration control 63 obtains user activation of, and a priority order of, a plurality of sort rules 68. The sort rules configuration control 63 includes a sort rules library 64 and an active sort rules list 70. The sort rules library 64 includes a listing of each sort rule 66 which the user may activate. The active sort rules list 70 includes a listing of the active sort rules 68.

In operation, the configuration function 52a prompts the user to paste sort rules 66 from the sort rules library 64 to the active sort rules list 68. Further, controls 72a and 72b controls the priority of the active sort rules 70. Like the active rules configuration control 57, the sort rules configuration control 63 may be implemented on a desktop or notebook computer and the configured sort rules 68 transferred to the portable device 36 or implemented directly on the portable device 36.

An exemplary sort rule is a "Coupon Priority" rule 66a. If the Coupon Priority rule 66a is an active sort rule 68, the transaction application 52 displays the transaction option indicators 42 which represent qualified coupons 76a above or before displaying the transaction option indicators 42 associated with other accounts 76 within the selected subset of accounts 76.

Another exemplary sort rule is a "Program Priority" rule 66b. If the Program Priority rule 66b is an active sort rule 68, the transaction application 52 displays the transaction option indicators 42 which represent accepted programs 76b above or before displaying the transaction option indicators 42 associated with other accounts 76 within the selected subset of accounts 76.

Another exemplary sort rule is a "User General Sort" rule 66c. If the User General rule 66c is an active sort rule 68, the transaction application 52 displays the transaction option indicators 42 associated with the selected accounts 76 in an order configured by the user. Such order is merchant-independent in that it is not an order particular to a merchant or class of entities.

Another exemplary sort rule is a "User Class Specific Sort" rule 66d. If the User Class Specific rule 66d is an active sort rule 68, the transaction application 52 displays the transaction option indicators 42 associated with the selected accounts in an order configured by the user—and such order is associated with a class of entities which includes the merchant (or other receiving entity) 30.

Another exemplary sort rule is a "General Learned Sort" rule 66e. If the General Learned Sort rule 66e is an active sort rule 68, the transaction application 52 displays the transaction option indicators 42 associated with each of the selected accounts 76 in the order determined by historical usage of each of the selected accounts 76 for transactions (for example payment transactions). Such order is merchant-independent in that it is not an order particular to a merchant or class of entities.

Another exemplary sort rule is a "Class Specific Learned Sort" rule 66f. If the Class Specific Learned rule 66f is an active sort rule 68, the transaction application 52 displays the transaction option indicators 42 associated with the selected accounts 76 in the order determined by historical usage of each of the selected accounts 76 for conducting transactions with the merchant 30 (or other receiving entity), or other merchants or entities within a same class of entities that includes the merchant 30 (or other receiving entity).

Figure 3:
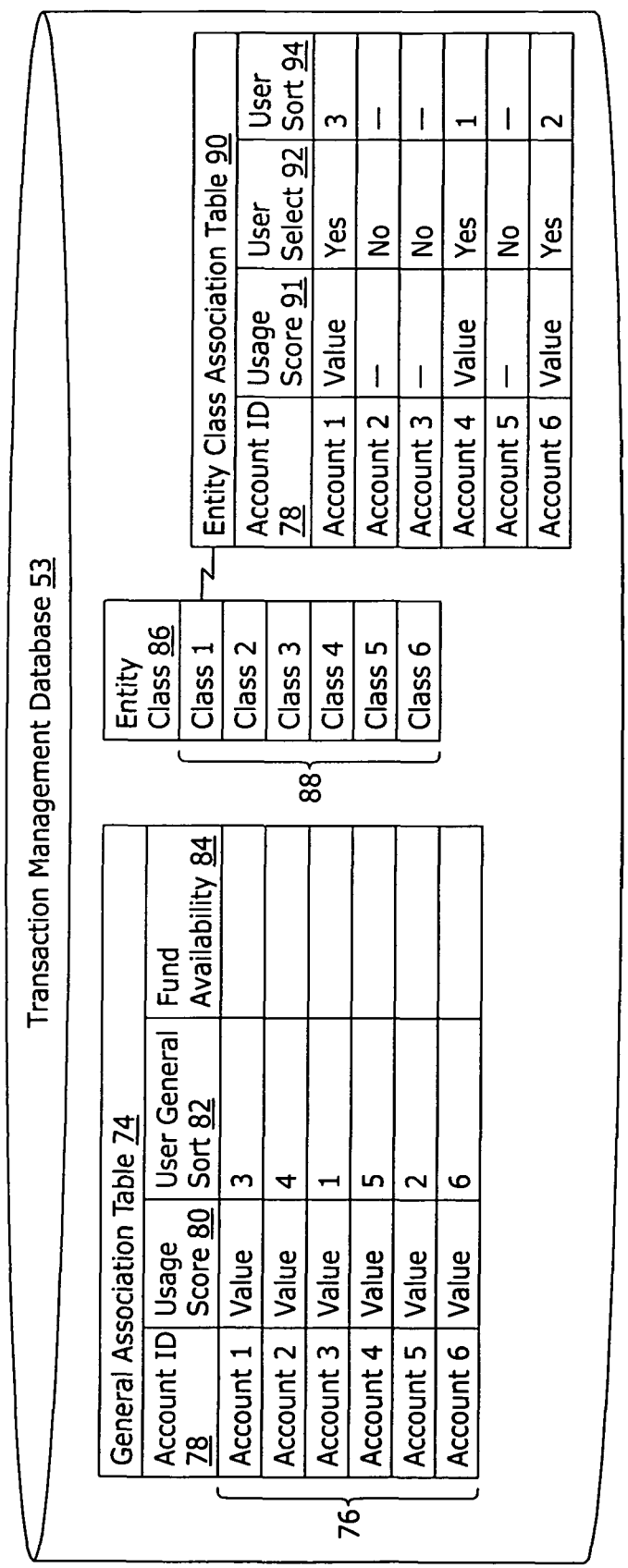
FIG. 3 is a diagram representing an exemplary transaction management database in accordance with one embodiment of the present invention.

Turning briefly to FIG. 3, an exemplary structure of a transaction management database 53 is shown. It should be appreciated that the database structure represented by FIG. 3 is exemplary only. Those skilled in the art will appreciate that other database structures may be chosen without departing from the scope of the present invention.

The database 53 may comprise a general association table 74 and a plurality of entity class association tables 90. Each of the entity class association tables 90 is associated with one of a plurality of specific entity classes 88 stored in a record of an entity class table 86. Each entity class may represent one or more merchants by name or by type. For example, entity class I may be a specific merchant. Entity class 2 may be a group of merchants meeting certain criteria such as being a gas station, a drug store, a grocery store, or a library.

Each of the entity class association tables 90 stores data used by the transaction application 52 for applying selection rules and sort rules that include implementation of selection criteria or sort criteria which is specific to the entity class 88 with which the table 90 is associated.

The general association table 74 stores data used by the transaction application 52 for applying selection rules and sort rules that include implementation of selection criteria or sort criteria which is not general (e.g. not specific to any particular entity of class of entities).

As discussed, if the Funds Availability rule 58*d* is an active selection rule 60, the transaction application 52 limits, with respect to payment accounts 76*c*, the transaction option indicators 42 displayed to those that are associated with payment accounts 76*c* that have sufficient funds (either account balance or available credit) for making the payment. As such, the transaction application 52 may limit the transaction option indicators 42 displayed to those that are associated with accounts that have a fund availability value 84 (in the general association table 74) that exceeds the proposed payment amount. The fund availability value 84 may represent a balance in a debit account or credit available for a credit or charge account.

As discussed, if the User Defined Selection rule 58*e* is an active selection rule 60, the transaction application 52 limits the transaction option indicators 42 displayed to those that are associated with accounts which the user has pre-selected to be available for making payments to a class of entities which includes the merchant (or other receiving entity) 30. As such, the transaction application 52 may limit the transaction option indicators 42 displayed to those that are associated with an indicator in a user selection field 92 (in the entity class association table 90 which corresponds to the merchant (or other receiving entity) 30) which indicates that the user has elected (by configuration) to include the account as a selected account for such entity class.

As discussed, if the User General Sort rule 66*c* is an active sort rule 68, the transaction application 52 displays the transaction option indicators 42 associated with the selected accounts in an order of preference configured by the user. As such, the transaction application 52 may display the transaction option indicators 42 associated with the selected accounts 76 in an order specified in the user general sort field 82 of the general association table 74.

As discussed, if the User Class Specific Sort rule 66*d* is an active sort rule 68, the transaction application 52 displays the transaction option indicators 42 associated with the selected accounts in a user-configured order for use in transactions with a class of entities that includes the merchant (or other receiving entity) 30. As such, the transaction application 52 may display the transaction option indicators 42 associated with the selected accounts 76 in the order specified in user sort field 94 of the entity class association table 90 that corresponds to the merchant 30 (or other receiving entity).

As discussed, if the General Learned Sort rule 66*e* is an active sort rule 68, the transaction application 52 displays the transaction option indicators 42 associated with the selected accounts in the order determined by historical usage of the respective accounts in transactions. As such, the transaction application 52 may display the transaction option indicators 42 associated with the selected accounts in an order determined by a value in the usage score field 80 of the general association table 74. The value in the usage score field 80 may be updated to reflect historical usage of the payment account each time it is used.

As discussed, if the Class Specific Learned Sort rule 66*f* is an active sort rule 68, the transaction application 52 displays the transaction option indicators 42 associated with the selected accounts in the order determined by historical usage of the payment account for making payments to the merchant (or other receiving entity) 30, or other merchants or entities within a same class of entities which includes the merchant (or other receiving entity) 30. As such, the transaction application 52 may display the transaction option indicators 42 associated with the selected accounts in the order determined by a value in the usage score field 91 of the entity class association table 90 which corresponds to the merchant 30. The value in the usage score field 91 may be updated to reflect historical usage of the payment account each time it is used.

In one exemplary embodiment, the values in each of the usage score field 80 and usage score field 91 may be values which represent the number of times the payment type was used within a predetermined period of time. More specifically, the values in the usage score field 80 may represent the overall number of times the payment account was used during the predetermined period of time and the values in the usage score field 91 of each entity class association table 90 may represent the number of times the payment account was used during the predetermined period at a merchant within the applicable class of entities.

Figure 4:
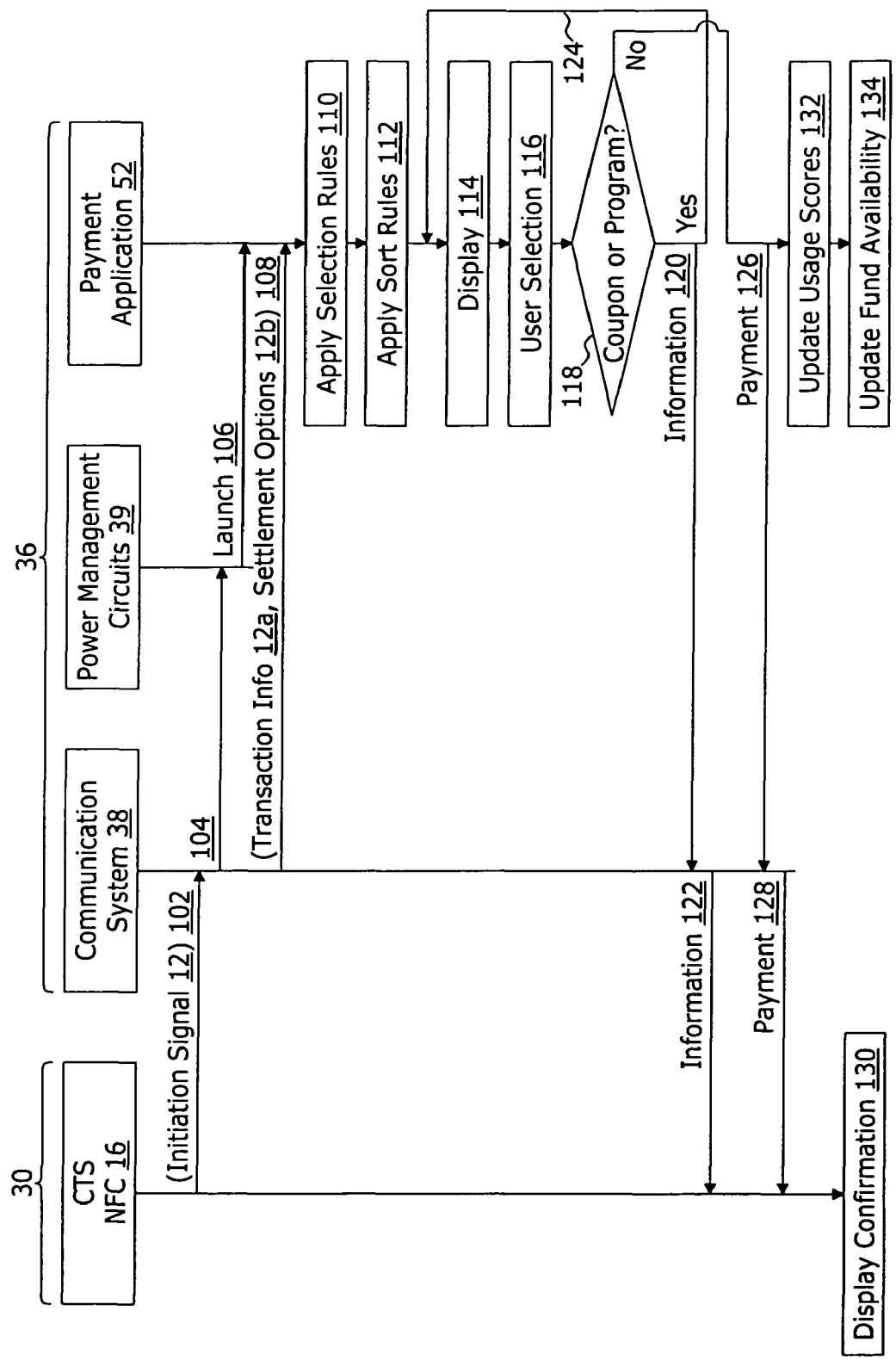
FIG. 4 is a ladder diagram representing exemplary operation of a system and method for utilizing a portable device to conduct a transaction in accordance with one embodiment of the present invention.

FIG. 4 is a ladder diagram that represents an exemplary operation of the portable payment system 36 for conducting a transaction in accordance with the present invention. Turning to FIG. 4 in conjunction with FIG. 1, the merchant 30 totals the user's sale on the CTS system 26 in a traditional manner.

Step 102 represents the NFC system 16 associated with the CTS 16 generating the transaction initiation signal 12 and the NFC system 38 of the portable device 36 detecting the transaction initiation signal 12. Step 104 represents the NFC system 38 signaling the power management circuits 39 to transition the portable device 36 from a low-power state to an active state and to launch the transaction application 52 step 106. Step 108 represents the communication system 38 passing the transaction information field 12*a* and the transaction settlement options field 12*b* to the transaction application 52.

Figure 5:
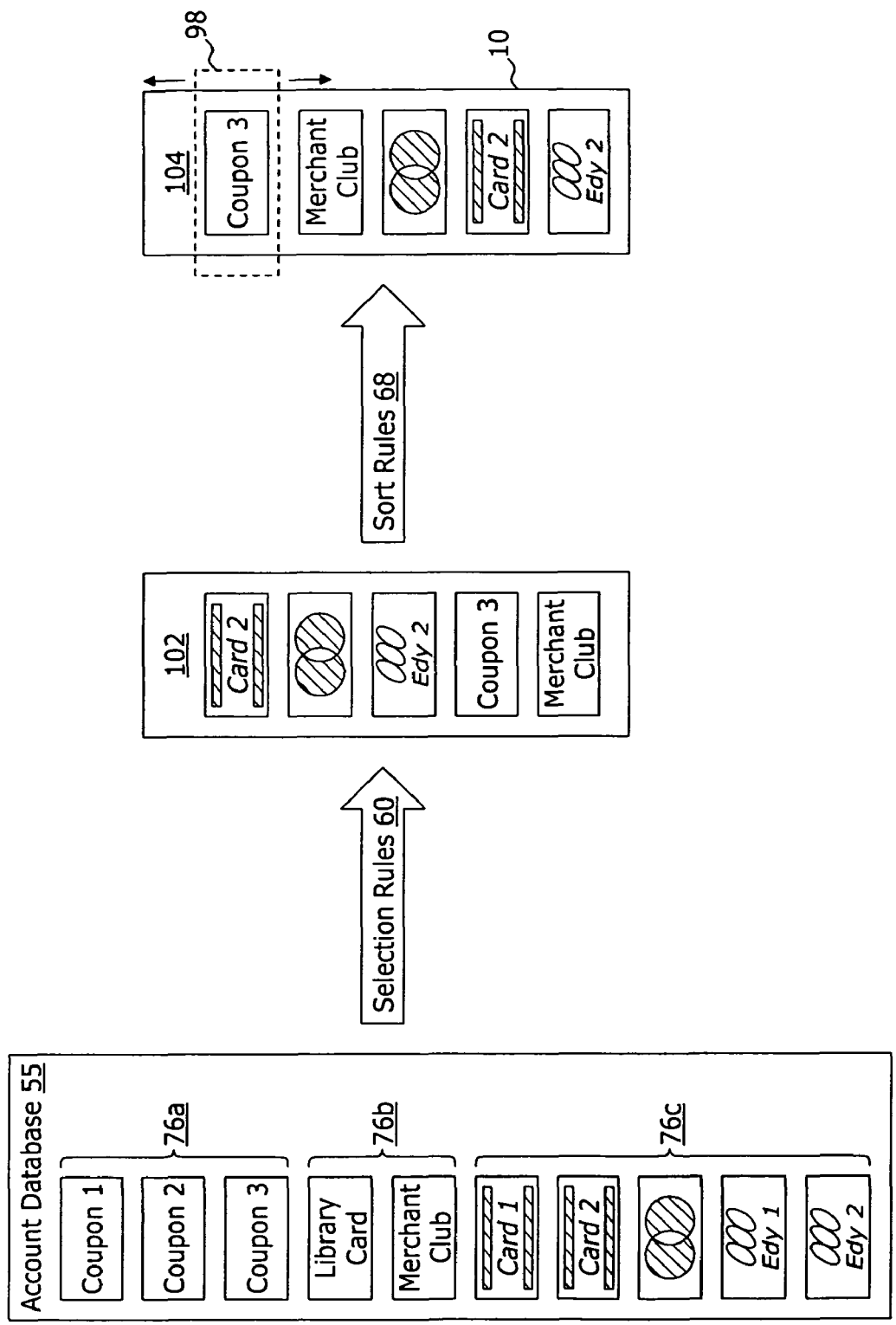
FIG. 5 is a diagram representing exemplary application of at least one selection rule and at least one sort rule in accordance with one embodiment of the present invention.

Step 110 represents the transaction application 52 (the transaction function 52*b*) applying the active selection rules 60 to select a subset of the accounts 76 stored in the account database 55 for which to display transaction option indicators 42. Referring briefly to FIG. 5 in conjunction with FIG. 2*a*, each active selection rule 60 is applied to the accounts 76 for which account information is stored in the account database 55 to determine the selected subset 102 of the accounts 76. Because each selection rule operates on a different type of account (e.g. coupons 76*a*, program accounts 76*b*, or payment accounts 76*c*), or narrows the subset of accounts (for example narrowing payment accounts 76*c* to those with sufficient funds), the order of application of active selection rules 60 may not be material.

Returning to FIG. 4, step 112 represents the transaction application applying the active sort rules 68 of the transaction management database 53 to select a priority order in which the transaction option indicators 42 are displayed.

Referring briefly to FIG. 5 in conjunction with FIG. 2*b*, each active sort rule 68 is applied to the accounts 76 within the selected subset 102 to determine a priority order 104 of such accounts 76. The active sort rules 68 are applied in the order as established by use of the sort rule configuration control 63.

As such, the first sort rule 68 applied determines the priority order, the next sort rule applied 68 operates to sort only those accounts 76 wherein priority order is indeterminable (e.g. the first sort rule is inapplicable or there is a tie) by application of the first sort rule 68.

Returning to FIG. 4, step 116 represents the transaction application obtaining user selection of a one (or at least one) of the transaction option indicators 42. As discussed with respect to FIG. 1, obtaining user selection of a one of the transaction option indicators 42 may be by: i) displaying a listing of the transaction option indicators 42 on the display 40; ii) enabling use of paired keys 46*a*, 46*b* for scrolling through the displayed transaction option indicators 42; and iii) enabling use of a selection key 48 for selection of a one of the transaction option indicators 42 for completing the transaction with the merchant (or other receiving entity) 30.

However, with brief reference to FIG. 6, if the portable device 36 is of a "clam shell" configuration with a display 98 on the external surface that is insufficient in size and/or resolution to display a plurality of transaction option indicators 42, obtaining user selection of a one of the transaction option indicators 42 may be by: i) sequencing the transaction option indicators 42 in accordance with the selection rules 60 and the sort rules 68; ii) displaying a single one of the transaction option indicators 42 from the sequence on the display 98; iii) enabling rotation of a thumbwheel 100 for scrolling which one of the sequence of transaction option indicators 42 is displayed; and iv) enabling use of the thumbwheel 100 (by a depression action) for selection of a one of the transaction option indicators 42 for making payment to the merchant (or other receiving entity) 30. With reference to FIG. 5 in conjunction with FIG. 6, this provides the effect of the display 98 being a "Window" that is scrolled over the priority order 104 of the transaction option indicators 42.

Returning again to FIG. 4 in conjunction with FIG. 1, if the selected transaction option indicator 42 is associated with an electronic coupon 76*a* (decision box 118), the transaction application 52 implements steps 120 and 124.

Step 120 represents the transaction application 52 sending coupon data to the communication system 38 for sending to the NFC device 16 associated with the CTS system 26 of the merchant (or other receiving entity) 30 (step 122). Step 124 represents return to step 114 where the remaining transaction option indicators 42 (after removing the transaction option indicator 42 for the used coupon) are displayed for user selection.

If at decision box 118 the selected transaction option indicator 42 is associated with a one of the accounts 76, the transaction application 52 implements steps 126, 132 and 134. Step 126 represents the transaction application 52 sending the account information for the selected payment account 76 to the communication system 38 for sending to the NFC device 16 of the CTS system 26 (step 128). Step 132 represents the transaction application updated the usage scores (fields 80 and 91) in the transaction management database 53 to reflect user selection and usage of the account. Step 134 represents updating the fund availably value (field 84) in the transaction management database 53 to reflect the payment.

With reference again to FIG. 1, an exemplary architecture for a system 10 provides utilizing a portable device 36 to initiate and authorize a payment transaction at a merchant's CTS by: i) receiving a transaction initiation signal 12 via NFC; ii) applying selection rules 60 of the transaction management database 53 for determining a subset of the accounts 76 stored in the account database 55 for which to display transaction option indicators 42; iii) applying sort rules 68 of the transaction management database 53 to select an order in which the transaction option indicators 42 are displayed; iv) prompting user selection of a one of the displayed transaction option indicators 42; and v) generating the transaction response signal 13 back to the NFC device 16 authorizing a payment to the merchant from a payment account associated with the selected one of the transaction option indicators.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A portable device for conducting a transaction from an account associated with the portable device, the portable device comprising:
   a communication system for communicating with a transaction system of a receiving entity;
   a user interface; and
   a memory storing account information for each of a plurality of accounts;
   a transaction application, the transaction application:
      applying at least one predetermined selection rule to the plurality of accounts to determine a selected subset of the plurality of accounts;
      displaying a plurality of transaction option indicators, each of the plurality of transaction option indicators representing a one of the selected subset of the plurality of accounts, wherein the plurality of transaction option indicators are displayed in a priority order, the priority order being determined by the transaction application applying at least one predetermined sort rule to the selected subset of the plurality of accounts;
      obtaining user selection of a selected at least one of the transaction option indicators; and
      driving the communication system to exchange data with the transaction system of the receiving entity to initiate a transaction with the receiving entity utilizing a transaction account associated with the selected at least one of the transaction option indicators.

2. The portable device of claim 1, wherein:
   the transaction application receives, from the transaction system of the receiving entity, an indication of each of a plurality of transaction settlement options accepted by the receiving entity;
   the at least one predetermined selection rule comprises limiting the selected subset of the plurality of accounts to only those accounts which correspond to a transaction settlement option accepted by the receiving entity.

3. The portable device of claim 2, wherein:
   the transaction application receives an indication of the requirements for settling the transaction;
   the at least one predetermined selection rule comprises including, in the selected subset of the plurality of accounts, only those payment accounts which meet the requirements for settling the transaction.

4. The portable device of claim 3, wherein:
   the requirements for settling the transaction include an indication of a payment amount due;
   the plurality of accounts include payment accounts; and
   the at least one predetermined selection rule comprises including, in the selected subset of the plurality of accounts, only those payment accounts which have an available credit which exceeds the payment amount due.

5. The portable device of claim 2, wherein the at least one predetermined selection rule comprises limiting the selected subset of the plurality of accounts to only those accounts which are associated with the receiving entity in a transaction management database.

6. The portable device of claim 5, wherein the predetermined sort rule is a rule which drives the priority order of the transaction option indicators based on an association between the receiving entity and the account in the transaction management database.

7. The portable device of claim 6, wherein the association between the receiving entity and the account in the transaction management database is a score value derived by tracking transaction activity of the portable device.

8. The portable device of claim 1, wherein:
wherein the portable device is a mobile telephone and the user interface comprises:
an external display on an outside of a housing;
a touch sensitive region on the outside of the housing; and
displaying a plurality of transaction option indicators, comprises the transaction application:
driving a portion of the touch sensitive region to operate a scroll function for driving the external display to sequentially display each of the transaction option indicators; and
driving a portion of the touch sensitive region to operate a selection function to obtain user selection of a selected at least one of the transaction option indicators.

9. A portable device for conducting a transaction from an account associated with the portable device, the portable device comprising:
a communication system for communicating with a transaction system of a receiving entity;
a user interface; and
a memory storing account information for each of a plurality of accounts;
a transaction application, the transaction application:
applying at least one predetermined selection rule to the plurality of accounts to determine a selected subset of the plurality of accounts;
displaying a plurality of transaction option indicators, each of the plurality of transaction option indicators representing a one of the selected subset of the plurality of accounts;
obtaining user selection of a selected at least one of the transaction option indicators; and
driving the communication system to exchange data with the transaction system of the receiving entity to initiate a transaction with the receiving entity utilizing a transaction account associated with the selected at least one of the transaction option indicators;
wherein the portable device is a mobile telephone of a clam shell configuration, and the user interface comprises:
an external display on an outside of a housing visible to a user when the mobile telephone is in a closed configuration; and
a plurality of user interface controls on the outside of the housing operable by the user when the mobile telephone is in the closed configuration; and
displaying a plurality of transaction option indicators, comprises the transaction application:
driving the user interface controls to operate a scroll function for driving the external display to sequentially display each of the transaction option indicators; and
driving the user interface controls to operate a selection function to obtain user selection of a selected at least one of the transaction option indicators.

10. The portable device of claim 9, further including power management circuitry:
i) controlling transition of the portable device from a limited power state to an active state; and
ii) initiating the transaction application upon the communication system receiving a signal from a transaction system of a receiving entity.

11. The portable device of claim 10, wherein:
the transaction application receives, from the transaction system of a receiving entity, an indication of each of a plurality of transaction settlement options accepted by the receiving entity;
the at least one predetermined selection rule comprises limiting the selected subset of the plurality of accounts to only those accounts which correspond to a transaction settlement option accepted by the receiving entity.

12. The portable device of claim 11, wherein:
the transaction application receives an indication of the requirements for settling the transaction;
the at least one predetermined selection rule comprises including, in the selected subset of the plurality of accounts, only those payment accounts which meet the requirements for settling the transaction.

13. The portable device of claim 12, wherein:
the requirements for settling the transaction include an indication of a payment amount due;
the plurality of accounts include payment accounts; and
the at least one predetermined selection rule comprises including, in the selected subset of the plurality of accounts, only those payment accounts which have an available credit with exceeds the payment amount due.

14. The portable device of claim 11, wherein the at least one predetermined selection rule comprises limiting the selected subset of the plurality of accounts to only those accounts that are associated with the receiving entity in a transaction management database.

15. The portable device of claim 11, wherein the transaction application further displays the plurality of transaction option indicators in a priority order, the priority order being determined by the transaction application applying at least one predetermined sort rule to the selected subset of the plurality of accounts.

16. The portable device of claim 15, wherein the predetermined sort rule is a rule which drives the priority order of the transaction option indicators based on an association between the receiving entity and the transaction account in the transaction management database.

17. The portable device of claim 15, wherein the association between the receiving entity and the payment account in the transaction management database is a score value derived by tracking transaction activity of the portable device.

18. The portable device of claim 9, wherein the plurality of user interface controls comprises:
at least three buttons on the outside of the housing operable by the user when the mobile telephone is in the closed configuration; and
driving the user interface controls to operate a scroll function for driving the external display to sequentially display each of the transaction option indicators comprises driving a first and a second of the at least three buttons to operate a scroll function for driving the external display to sequentially display each of the transaction option indicators; and
driving the user interface controls to operate a selection function to obtain user selection of a selected at least one of the transaction option indicators comprises driving a third of the at least three buttons to operate a selection function to obtain user selection of a selected at least one of the transaction option indicators.

19. The portable device of claim 18, wherein the first and the second of the at least three switches are paired buttons.

20. The portable device of claim 9, wherein the plurality of user interface controls comprises:
a thumbwheel on the outside of the housing operable by the user when the mobile telephone is in the closed configuration; and
driving the user interface controls to operate a scroll function for driving the external display to sequentially display each of the transaction option indicators comprises driving the thumbwheel, by rotation thereof, to operate a scroll function for driving the external display to sequentially display each of the transaction option indicators; and
driving the user interface controls to operate a selection function to obtain user selection of a selected at least one of the transaction option indicators comprises driving the thumbwheel, by depression thereof, to operate a selection function to obtain user selection of a selected at least one of the transaction option indicators.

21. A method of operating a portable device for conducting a transaction from an account, the method comprising:
maintaining an account database storing account information for each of a plurality of accounts;
applying at least one predetermined selection rule to the plurality of accounts to determine a selected subset of the plurality of accounts;
displaying a plurality of transaction option indicators, each of the plurality of transaction option indicators representing a one of the selected subset of the plurality of accounts, wherein the plurality of transaction option indicators are displayed in a priority order, the priority order being determined by the transaction application applying at least one predetermined sort rule to the selected subset of the plurality of accounts;
obtaining user selection of a selected at least one of the transaction option indicators; and
generating a communication signal to a transaction system of a receiving entity, the communication signal including the account information of the selected at least one of the transaction option indicators.

22. The method of claim 21:
further comprising, receiving, from the transaction system of the receiving entity, an indication of each of a plurality of transaction settlement options accepted by the receiving entity; and wherein
the at least one predetermined selection rule comprises limiting the selected subset of the plurality of accounts to only those accounts which correspond to a transaction settlement option accepted by the receiving entity.

23. The method of claim 22:
further comprising, receiving, from the transaction system of a receiving entity, an indication of requirements for settling the transaction; and wherein
the at least one predetermined selection rule comprises including, in the selected subset of the plurality of accounts, only those payment accounts the meet the requirements for settling the transaction.

24. The method of claim 23:
wherein the requirements for settling the transaction include an indication of a payment amount due;
the plurality of accounts include payment accounts; and
the at least one predetermined selection rule comprises including, in the selected subset of the plurality of accounts, only those payment accounts which have an available credit which exceeds the payment amount due.

25. The method of claim 22, wherein the at least one predetermined selection rule comprises limiting the selected subset of the plurality of accounts to only those accounts which are associated with the receiving entity in a transaction management database.

26. The method of claim 21, wherein the at least one predetermined sort rule is a rule which drives the priority order of the transaction option indicators based on an association between the receiving entity and the payment account in a transaction management database.

27. The method of claim 26, wherein the association between the receiving entity and the payment account in the transaction management database is a score value derived by tracking payment activity of the portable device.

* * * * *

UNITED STATES PATENT AND TRADEMARK OFFICE
CERTIFICATE OF CORRECTION

PATENT NO. : 7,802,719 B2  Page 1 of 1
APPLICATION NO. : 11/537347
DATED : September 28, 2010
INVENTOR(S) : Phillip Marc Johnson, L. Scott Bloebaum and Daniel P. Homiller It is certified that error appears in the above-identified patent and that said Letters Patent is hereby corrected as shown below:

Specification, Column 18, Claim 23, Lines 18-19, "...the meet the requirements" should read -- that meet the requirements --.

Signed and Sealed this
Twenty-ninth Day of March, 2011

David J. Kappos
*Director of the United States Patent and Trademark Office*